UNITED STATES PATENT OFFICE.

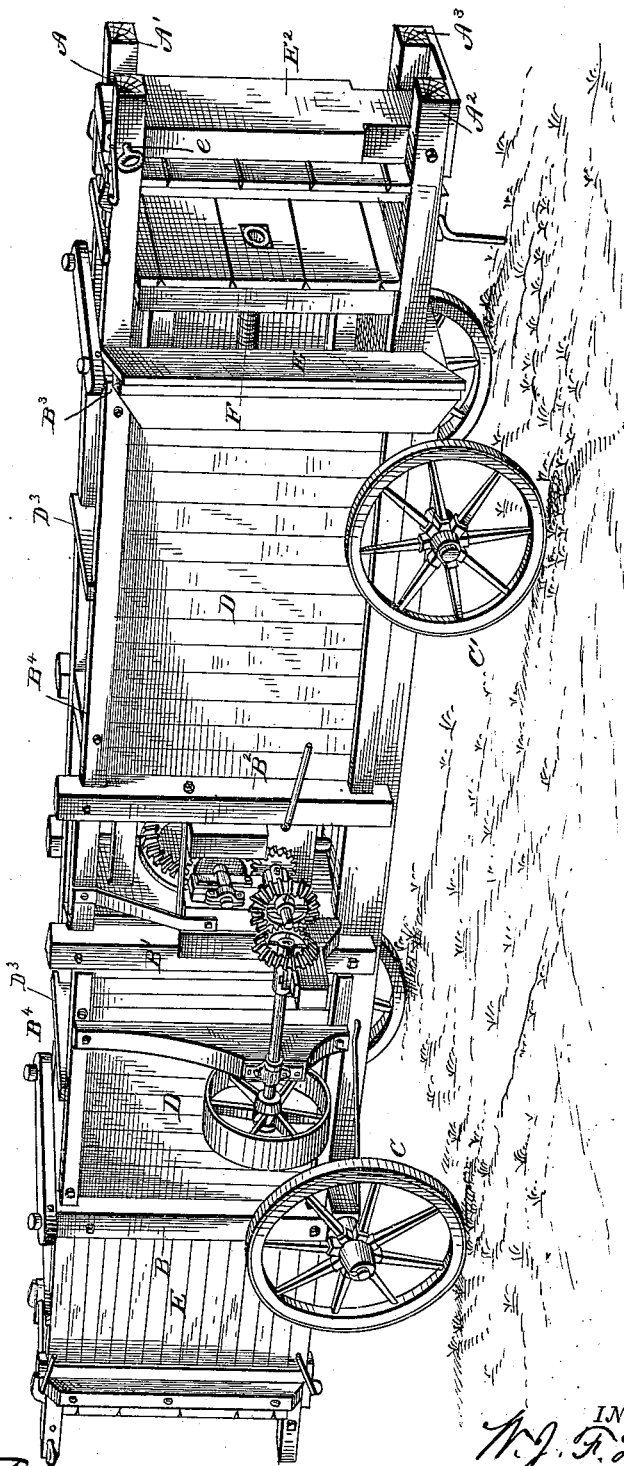

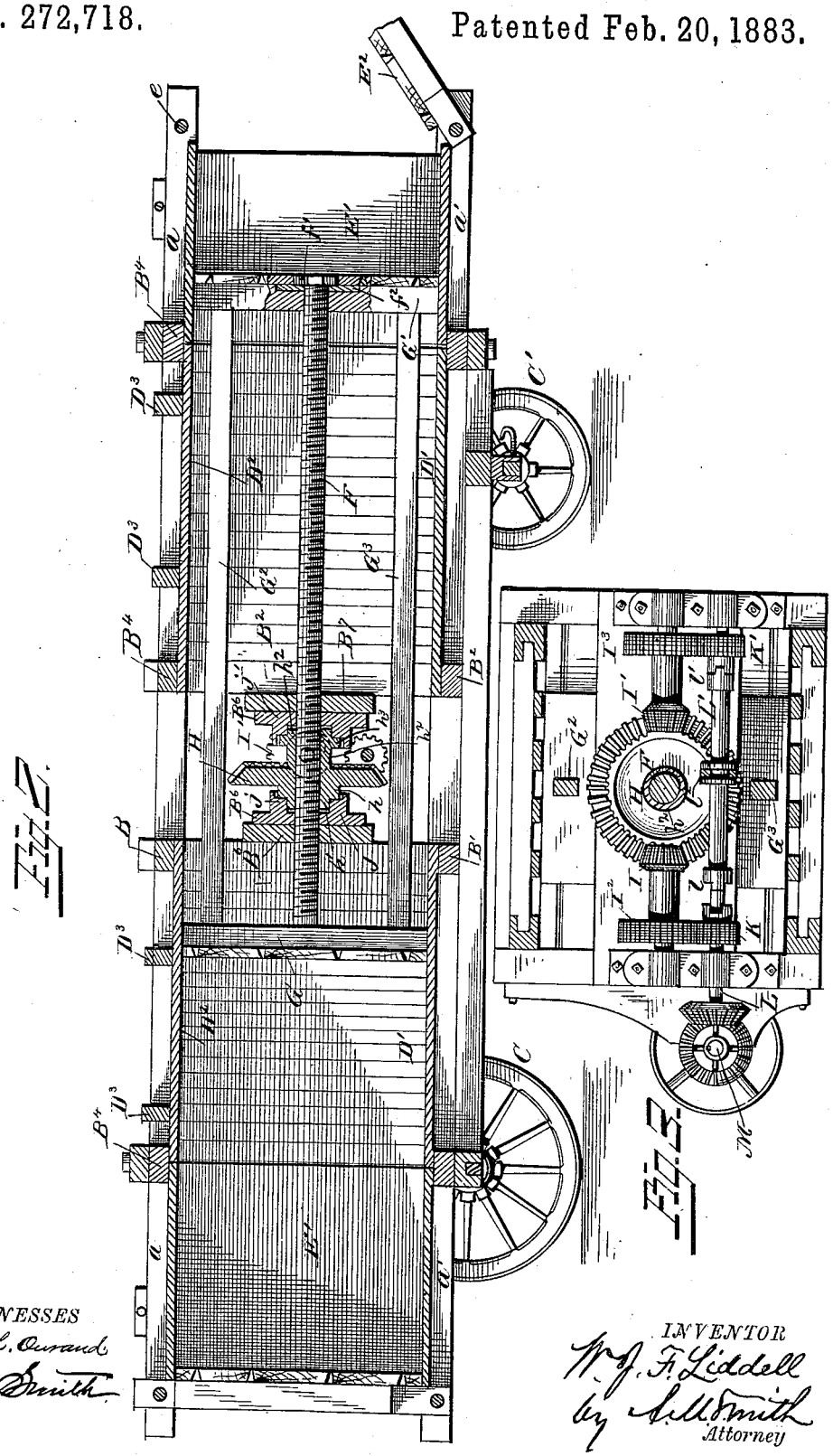

WALTER J. F. LIDDELL, OF CHARLOTTE, NORTH CAROLINA.

PORTABLE PRESS.

SPECIFICATION forming part of Letters Patent No. 272,718, dated February 20, 1883.

Application filed December 9, 1882. (No model.)

*To all whom it may concern:*

Be it known that I, WALTER J. F. LIDDELL, of Charlotte, county of Mecklenburg, State of North Carolina, have invented a new and useful Improvement in Portable Presses, of which the following is a full, clear, and exact description, reference being had to the accompanying drawings, making part of this specification.

The invention relates to a novel construction of portable double press having baling chambers or compartments at each end and means for compressing and baling the material to be operated upon in said ends or chambers alternately, and to certain details of construction and arrangement of parts in carrying out said invention and facilitating the discharge or removal of the bales, as hereinafter explained.

In the accompanying drawings, Figure 1 is a perspective view of my improved press complete. Fig. 2 represents a longitudinal vertical section through the same, with one of the end doors open; and Fig. 3 is a transverse vertical section taken between the two great plates.

In the portable double presses heretofore employed it has been usual to compress both bales at the same time by plungers moving in opposite directions; but this required double the power required for the compression of a single bale; but by my arrangement, hereinafter described, the bales are compressed singly, and while one of the plungers is being operated to compress a bale the other is being withdrawn to permit the bale to be discharged and its chambers to be charged preparatory to the compression of another bale therein, as will be understood from the following description with reference to the drawings.

A A' A² A³ represent four longitudinal frame-bars, united in the form of a long rectangular frame by upright and transverse frame-timbers B, B', B², B³, and B⁴, B and B³ indicating the end uprights nearest the ends of the longitudinal bars, which project beyond them, B' and B² the intermediate uprights, and B⁴ the horizontal connecting-bars. These bars, constituting the frame of the press, are united in any suitable manner, and are mounted upon wheel-trucks C and C', one of which is pivoted to said frame and provided with a suitable pole or tongue, adapting the press to be drawn or transported from place to place, as desired.

The vertical sides D and bottom D' of the frame, between the uprights B and B', and also between B² and B³, are permanently boarded up, forming three sides of the compressing-chamber at its inner end, the boards being let into rabbets or secured to strips on the inner faces of the timbers A in such manner as to bring them flush on their inner faces with the inner faces of said timbers, while the upper wall is made removable to facilitate the charging of the chamber. This may be done by securing the boards D² to the inner faces of transverse strips or handle-bars D³, allowing the ends of the boards to project, so that they can be pushed under one of the intermediate transverse frame-bars, B⁴, far enough to allow the opposite ends of the boards to pass the transverse bars connecting the end uprights, B' or B³, when by reversing the movement of the boards the ends are passed under said last-named transverse bars, and are thereby secured in place, a reverse movement serving to remove these upper walls or doors when required. Any other suitable arrangement of door forming the upper wall of this part of the chamber may, however, be employed.

The portions $a\ a'$ of the longitudinal timbers projecting beyond the uprights B and B³ at either end are provided also with permanent horizontal floor and covering boards, while the vertical side and end walls are made in the form of doors E, E', and E², the former or side doors, E and E', being connected with the frame-timbers by upright pivots at their inner ends, as shown, while the end door is connected by a horizontal pivot with the projecting ends of the lower longitudinal timbers, A² and A³, a pin or rod, $e$, connecting its swinging end with the upper timbers, A and A', when the door is closed.

It will be seen that by the construction of the portion of the press-chamber projecting beyond the uprights, as described, the upper timbers, A and A', are rigidly connected with each other, as are also the lower timbers, by the fixed wall-boards, and by suitable crossties, if desired, thereby preventing relative lateral vibration of said timbers; but the upper timbers being disconnected at their projecting ends from the lower ones, except when the doors are closed and fastened, the overhanging ends of said upper and lower timbers are adapted to vibrate vertically relatively to each other, and when the lower timbers are released by the opening of the doors the weight of the bale and its compressed condition tend to force the ends of the upper and lower timbers apart, and thus to free the bale and permit its ready removal.

The gearing or mechanism employed for compressing the material operated upon is substantially the same as that shown and described in Letters Patent granted to me May 10, 1881, with such modifications as are necessary to adapt it to a horizontal instead of an upright press and to a double instead of the single press there described—that is to say, the traveling screw F for actuating the plunger extends between two plungers, secured one to each end, as follows: The plungers are composed each of a stout bar, G or G', to the outer opposite faces of which transverse strips or slats $g$ are secured, with spaces left between for the passage of the baling-wires. The ends of the screws pass through the bars G and G' at the center of their length, and are provided with screw-threads for the reception of nuts $f'$, let into recesses formed in the outer faces of the bars G and G' for their reception, and for the reception, also, of large metallic washers $f^2$, said nuts serving to secure the plungers firmly to the ends of the screw F.

$G^2$ and $G^3$ are stout longitudinal rods or bars rigidly connecting the cross bars or heads G and G' at their ends, and serving to take the strain from the screw, and enabling the latter to act upon the plungers in either direction with a drawing instead of a thrusting action.

The combined gear and rotating nut H, through which an endwise movement is imparted to the screw F, is made in the form of a centrally-perforated bevel-gear, to which motion is imparted by one of two bevel-pinions, I or I', both engaging or meshing therewith. These bevel-pinions are mounted upon short axles arranged radial to the screw F and both in the same plane, and each has a spur-pinion, $I^2$ or $I^3$, secured to and turning with it, to which motion is imparted by a corresponding gear, K or K', or a transverse shaft, L, crossing the gear and nut H on one side of the screw F. The shaft L is square or grooved between the pinions K and K', and has a sleeve, L', sliding upon and turning with it, said sleeve being provided at its ends with collars $l$ and $l'$, having clutch-faces adapting them to engage corresponding clutch-faces on the hubs of pinions K and K', for connecting one or other of said pinions with the shaft L. The shaft L extends laterally beyond the frame at one end, and is provided with a bevel-wheel engaging with a similar wheel, or a short longitudinal shaft, M, provided with a band-wheel or other suitable appliance adapting it to be connected with and driven from any convenient power. Whichever of the gears K or K' is coupled to its shaft will serve to drive the bevel-gear H through its connecting-gear, as explained, while the other, being left loose on its shaft, will rotate freely thereon, driven by said bevel-wheel through its connection therewith, as explained. The clutch-sleeve L' has a grooved collar, $l^2$, to receive the fork of a shipping-lever, for giving the sleeve an endwise movement on its shaft for engaging either of the pinions K or K' with the shaft and reversing the direction of rotation of the bevel-wheel H at will.

The central perforation of the wheel H is threaded to conform to the thread of the screw F, and forms the rotating nut through which endwise movement is imparted to said screw, the direction of movement changing with the direction of rotation of the nut. This combined gear and nut has a hub, $h$, having a sleeve-extension, $h'$, on one side or face, and a sleeve, $h^2$, provided with a collar, $h^3$, on the other face, the collar and extension of the sleeve beyond it on one side corresponding to the hub and sleeve on the other side, and these ends of the hub or collar and sleeve rest one in a flanged annular cup, J, secured to a transverse bar, $B^6$, bolted to the frame uprights B', and the other in a similar cup, J', secured to a bar, $B^7$, attached to the frame-uprights $B^2$. These annular cups J and J' and the hub and sleeve on the combined gear and nut are similar to the corresponding parts described in another application filed herewith—that is to say, the hub $h$ and the collar $h^3$ rest upon shoulders $j$ of the cups and sustain the end-thrust of the screw thereon, while the sleeve portions $h'$ and $h^2$ of the hub form reduced journals to the rotating nut, the difference between the construction here shown and that described in the other application referred to being that in the horizontal double press herein described it becomes necessary to support the nut against the end-thrust of the screw in both directions of movement of said screw, while in the other application, the pressure being applied only in one direction, and that upward, the weight of the moving platen and its attachments serves always to hold the nut in its seat when the platen is being retracted.

In my former patent, referred to herein, a single upright press is described, and in retracting the plunger to economize time the gearing was so arranged as to give a more rapid movement thereto; but in the present construction the same power is required to move the screw in one direction as in the other, and the gears J and K, for rotating the gear and nut H in one direction, are of the same size as those J' and K', for rotating in the opposite direction, giving the same speed and the same power for moving the screw one way as for moving it the other.

The manner of hanging the press-doors, the locking or fastening devices therefor, together with other parts of the press not herein particularly described, may be as described in my former patent referred to, or in any usual or preferred manner.

Having now described my invention, what I claim as new is—

1. In a portable horizontal press, the longitudinal frame-timbers projected beyond the connecting upright frame-timbers to form the baling-chamber, in combination with the side and end doors connecting the projecting upper and lower walls of said chamber, substantially as described, whereby when the doors are released or opened said upper and lower walls are adapted to yield outward for freeing the bale, substantially as set forth.

2. A portable horizontal press having a baling-compartment in each end, in combination with two rigidly-connected platens or plungers, and an interposed screw, connected with said plungers, substantially as described, whereby said screw is adapted to act with a drawing instead of a thrusting action, for compressing a bale in either compartment.

3. The combination, in a portable press having two baling-compartments, of the plungers G and G′, the connecting-bars G² and G³, and the interposed screw F, connected with said plungers, and operating substantially as described.

4. In a portable horizontal press, the longitudinal frame-timbers projected at both ends beyond the connecting uprights to form the baling-chambers, and the vertical side and end doors for connecting said projecting ends, in combination with the screw F, plungers G and G′, connecting-bars G² and G³, and combined gear and nut H, with its shouldered hubs and sleeves supported in annularly-rabbeted bearing-plates on its opposite sides or faces, substantially as described.

In testimony whereof I have hereunto set my hand this 4th day of December, A. D. 1882.

WALTER J. F. LIDDELL.

Witnesses:
  WARREN C. STONE,
  REX SMITH.